2,872,330
Patented Feb. 3, 1959

2,872,330

METHODS OF MAKING A LIGNOCELLULOSE PRODUCT AND THE PRODUCT RESULTING THEREFROM

William T. Glab, Dubuque, Iowa, assignor to Caradco Incorporated, a corporation of Iowa No Drawing. Application September 6, 1956
Serial No. 608,196

19 Claims. (Cl. 106—163)

This invention relates to methods of making a moldable composition from lignocellulose and to the products resulting therefrom.

One of the objects of this invention is to provide an improved method of making a moldable composition comprising reacting a mixture including comminuted lignocellulose and a finely divided solvent extracted solid pine wood resin substantially free of wood rosin by heating the mixture while confining the mixture under superatmospheric pressure.

A more specific object of the invention is to provide a method of making a moldable composition comprising reacting an essentially dry mixture including comminuted lignocellulose, a finely divided solvent extracted solid pine wood resin substantially free of wood rosin, a member of the class consisting of steam, sulfur, sulfur dioxide, hydrogen sulfide, lime, formaldehyde, acetylene, steam plus sulfur plus sulfur dioxide, steam plus sulfur plus formaldehyde plus ammonium hydroxide, and steam plus sulfur, a nitrogen containing base having a reactive hydrogen atom, and a member of the class consisting of zinc oxide, titanium oxide, and manganese oxide while confining the mixture under superatmospheric pressure.

A further feature of the invention is to provide a method of making a moldable composition comprising reacting an essentially dry mixture including comminuted lignocellulose, finely divided solvent extracted solid pine wood resin substantially free of wood rosin, and a nitrogen containing base having a reactive hydrogen atom while confining the mixture under superatmospheric pressure.

Yet another feature of the invention is to provide a method of making a moldable composition comprising reacting an essentially dry mixture including comminuted lignocellulose, a finely divided solvent extracted solid pine wood resin substantially free of wood rosin, a nitrogen containing base having a reactive hydrogen atom, and a member of the class consisting of zinc oxide, titanium oxide, and manganese oxide.

Other features and advantages of the invention will be apparent from the following description of the invention including certain embodiments thereof.

When comminuted lignocellulose such as ground wood and the like is heated under superatmospheric pressure, a hydrolysis reaction apparently occurs and the resulting product is moldable and has a certain degree of plasticity. This is particularly true when the lignocellulose is heated in the presence of a reactant which may be either steam, sulfur, ammonium hydroxide, sulfur dioxide, hydrogen sulfide, lime, formaldehyde, acetylene, and combinations of these, preferably steam plus sulfur plus sulfur plus ammonium hydroxide, steam plus sulfur plus sulfur dioxide, steam plus sulfur plus formaldehyde plus ammonium hydroxide, steam plus sulfur, as well as others.

Among the important properties which are obtained from such reaction products prepared from lignocellulose as described above is its plasticity, which gives it the desirable properties of being moldable into intricate shapes since the product will completely fill a mold in a molding operation. The product is also extrudable from an ordinary extrusion press.

Although such a lignocellulose product has the characteristic of being moldable including being extrudable, it has been observed that the plasticity can be greatly improved if the reaction with the lignocellulose is carried out in the presence of a finely divided solvent extracted solid pine wood resin substantially free of wood rosin. Such a pine wood resin is preferably made from southern pine wood and may be produced by extracting the pine wood with a solvent capable of extracting in the cold from the wood a mixture including wood rosin and resinous substances other than rosin. After the extraction, the solvent is evaporated leaving the extracted rosin and other resinous substances as a solid residue. This is then extracted with a solvent for rosin which will not dissolve the other resinous components of the original solid residue and which are separated from the extract and comprise the improved resin which is used in the herein described process.

In a practical procedure for providing the wood resin, pine wood, preferably from the southern long leaf pine with or without preliminary steaming of the wood chips to remove the turpentine and pine oil content, is extracted with a solvent which is a solvent for the FF rosin, turpentine, and pine oil contained in the wood chips. This solvent is also a solvent for the other complex substances contained in the wood chips. Such a solvent may be, for example, a coal tar hydrocarbon such as benzol, toluol, xylol, and the like. The extraction may be accomplished by flooding the pine wood chips with a solvent with or without the use of heat.

When the extraction of the chips has been sufficient, the coal tar hydrocarbon solution of matter extracted from the pine wood chips is drawn off the wood chips and the solvent evaporated. This evaporation leaves turpentine, pine oil, rosin, and the wood resin with which this invention is concerned all in admixture. The turpentine and pine oil are then removed by distillation leaving a dark colored residue comprising a mixture of FF wood rosin and the wood resin. This mixture is then extracted with a substance which is a solvent for the FF rosin, but not a solvent for the resin. Such a solvent may, for example, be petroleum hydrocarbons such as petroleum ether, gasoline, heptane, hexane, or the like or an operable equivalent thereof. This solvent is preferably used at an elevated temperature. When the residue from the coal tar hydrocarbon or other solvent extraction has been sufficiently extracted, a dark colored resinous substance remains which, when freed from occluded gasoline, is the wood resin substantially free of wood rosin that is employed in this invention.

Such a resin as set out above is sold under the trademark "Vinsol." The preparation of this product and its characteristics are described in L. C. Hall Patent 2,193,026, dated March 12, 1940, and in the publication by Hercules Powder Company, copyright 1953, entitled "Vinsol," 1953 edition. This wood resin is substantially free of wood rosin and is characterized by its solubility in alcohol, substantial insolubility in gasoline, a methoxy content of about 3% to about 6%, an acid number of about 100, a naphtha insolubility of about 98% and a melting point of about 125° C. An analysis of a typical sample of Vinsol is as follows:

| | |
|---|---:|
| Softening point (ASTM ring and ball), ° C. (° F.) | 108 (226) |
| Acid number | 94 |
| Saponification number | 165 |
| Unsaponifiable matter (ASTM D 1065), percent | 7.7 |
| Gasoline soluble, percent | 17 |
| Acetone insoluble, percent | 0.05 |
| Toluene insoluble (ASTM D 269), percent | 15 |
| Gasoline insoluble, percent | 83 |
| Petroleum ether insoluble, percent | 98 |
| Methoxyl ($-OCH_3$) content (ASTM or AOAC), percent | 5.3 |
| Oxygen absorption (300 lb./sq. in., 7 days), percent | 0.25 |
| Coefficient of cubical expansion per 1° C. (30–170° C.) | 0.00056 |
| Density at 25° C. | 1.218 |
| Specific heat (20–245° C.) | 0.50 |
| Bulking density, lb./cu. ft., approximately: | |
| Flake | 42 |
| Pulverized | 40 |

Another wood resin that has properties similar to Vinsol and that may also be used is "Solo."

In practicing the invention, the lignocellulose and the reactants including the wood resin are heated under superatmospheric pressure as in a confined press or in an autoclave. The resulting product is considerably more plastic and, thus, more easily molded than is the same product without the resin. Furthermore, the product with the resin has a higher resistance to moisture and a greater strength.

Tests have shown that the wood resin enters into the reaction during the process as these improved results are not obtained if all reactants including the lignocellulose but minus the wood resin are reacted in a confined atmosphere and under the same conditions and then the wood resin added later. Although adding the wood resin without causing it to enter into the reaction does improve the plasticity to a small degree, this improvement is only minor.

In one example of practicing the method of this invention, 100 parts by weight of finely divided Ponderosa pine wood ground to pass substantially entirely through a standard 50 mesh screen were mixed with 15 parts of powdered Vinsol to make a uniform mixture. This mixture was then placed in an autoclave and heated for 25 minutes in an atmosphere of steam at 300 pounds per square inch gauge pressure and at a temperature of 425° F. At the end of this time, the mixture was removed from the autoclave and was found to be a substantially uniform, dark, plastic, moldable material. The product when extruded in a National Rubber Machinery Company 1" bench extruder with a die setting of 290° F., a cylinder temperature of 285° F., and a speed setting at the minimum revolutions per minute had an extrusion rate through a 3/16" by 3/4" die of 5.85 inches per minute. It also had a modulus of rupture of 5500 pounds per square inch when subjected to a standard flexural test. When boiled for one hour in water, its increase in thickness as a result of this boil test was only 3.68%.

In contrast to these values, this same finely divided wood treated under these conditions but without Vinsol had an extrusion rate in the manner set out above of 2.6 inches per minute and a modulus of rupture of 3336 pounds per square inch, and when subjected to the boil test, decomposed.

To show that the wood and Vinsol actually entered into a chemical reaction, autoclaved wood prepared under the above conditions was mixed with 15 parts of Vinsol per 100 parts of the autoclaved wood and was found to have an extrusion rate as described of 3.2 inches per minute and a modulus of rupture of 3761 pounds per square inch, and it also decomposed when subjected to the above boil test.

Although the action of the Vinsol on the lignocellulose is not known, it appears very likely that the Vinsol reacts with the lignocellulose and the lignocellulose products by a combination of condensation of the Vinsol with the lignin and polymerization with the hydrolysis by-products of the lignocellulose including furfural. The exact reactions are not known as they are quite complicated due to the many reactants and reaction products that are formed during the process.

This reaction can be further modified to produce useful plastic products by adding to the finely divided lignocellulose and Vinsol either one or a combination of the following reactants: steam, sulfur, sulfur dioxide, hydrogen sulfide, lime, formaldehyde, acetylene, steam plus sulfur plus sulfur dioxide, steam plus sulfur plus formaldehyde plus ammonium hydroxide, and steam plus sulfur. The preferred added reactant is sulfur as it contributes to the production of a moisture-resistant extrudable composition of extremely high strength.

Thus, in one example, the product was made by dry-mixing 100 parts by weight of ponderosa pine sawdust containing only its natural moisture content, 12 parts by weight of sulfur, and 15 parts by weight of Vinsol. This mixture was autoclaved for 25 minutes in the presence of steam at a gauge pressure of 300 pounds per square inch at a temperature of 425° F. It was then tested for its extrusion rate as described above through a 3/16" by 3/4" die and was also given the above described boil test and tested for its modulus of rupture. In order to show the superiority of this product, tests were also made by autoclaving the above wood and sulfur mixture and then adding the Vinsol after the mixture has been removed from the autoclave, autoclaving wood and sulfur only, and autoclaving wood and Vinsol without the presence of sulfur. The following results were achieved:

| Composition | Autoclave Time, min. | Extrusion Rate, In./Min. | Boil Test, Percent | Modulus of Rupture, p. s. i. |
|---|---|---|---|---|
| 100 Parts Wood +12 Parts Sulfur | 25 | 4.80 | 2.45 | 3,585 |
| 100 Parts Wood+12 Parts Sulfur (15% Vinsol Added After Autoclave) | 25 | 5.32 | 3.75 | 4,740 |
| 100 Parts Wood +12 Parts Sulfur+15 Parts Vinsol | 25 | 5.22 | 1.98 | 6,670 |
| 100 Parts Wood+15 Parts Vinsol | 25 | 5.85 | 3.68 | 5,500 |

From the above data, it can be seen that the reaction product of wood, Vinsol, and sulfur produced a strong water-resistant product that was greatly superior to the one produced by adding Vinsol after the autoclaving of the wood and sulfur only. Furthermore, the wood-sulfur-Vinsol autoclaved mixture was superior to either an autoclaved wood-Vinsol mixture or an autoclaved wood-sulfur mixture. It should be noted that the autoclaved wood-sulfur mixture with the Vinsol added after was superior to the wood-sulfur autoclaved mixture to which no Vinsol was added. Similarly, the wood-Vinsol mixture without sulfur was superior in the above described properties to the wood-sulfur autoclaved mixture.

It has also been found that the reaction product can be further improved in physical properties by the addition of either small amounts of a nitrogen-containing base having a reactive hydrogen atom including amines such as aniline and ammonia or by adding this base in combination with a metallic oxide, particularly either zinc oxide, titanium oxide, manganese oxide, or a mixture of these. The preferred base is either aniline or ammonia either in the form of a gaseous ammonia or ammonium hydroxide. Examples of such improved products are as follows, with these products being produced under the same conditions as those set out above. Here, as is true throughout this application, the parts are parts by weight:

| Composition | Autoclave Time, min. | Extrusion Rate, In./Min. | Boil Test, percent | Modulus of Rupture, p. s. i. |
|---|---|---|---|---|
| 100 Parts Wood +15 Parts Vinsol +12 Parts Sulfur | 25 | 5.22 | 1.98 | 6,670 |
| 100 Parts Wood +15 Parts Vinsol +5 Parts Aniline +12 Parts Sulfur | 25 | 5.75 | 1.89 | 6,822 |
| 100 Parts Wood +15 Parts Vinsol +5 Parts Aniline +2 Parts Zinc Oxide +12 Parts Sulfur | 25 | 6.2 | 1.61 | 7,302 |
| 100 Parts Wood +15 Parts Vinsol +5 Parts Aniline +2 Parts Zinc Oxide +12 Parts Sulfur | 30 | | 1.63 | 7,581 |
| 100 Parts Wood +15 Parts Vinsol +3 Parts Ammonium Hydroxide +2 Parts Zinc Oxide +12 Parts Sulfur | 30 | | 2.30 | 7,242 |
| 100 Parts Wood +15 Parts Vinsol +5 Parts Aniline +12 Parts Sulfur | 20 | | 1.78 | 6,354 |
| 100 Parts Wood +15 Parts Vinsol +5 parts Aniline +2 Parts Zinc Oxide +12 Parts Sulfur | 20 | | 2.32 | 6,921 |
| 100 Parts Wood +15 Parts Vinsol +5 Parts Aniline +2 Parts Titanium Dioxide +12 Parts Sulfur | 20 | | 2.65 | 7,090 |
| 100 Parts Wood +15 Parts Vinsol +5 Parts Aniline +2 Parts Manganese Dioxide +12 Parts Sulfur | 20 | | 2.88 | 6,921 |

From the above it is apparent that the addition of a base or of a base mixed with metal oxide increases the plasticity, water resistance, and strength of the material.

It is preferred that the amount of Vinsol used to produce the reaction products of this invention be up to 25 parts of Vinsol per 100 parts of lignocellulose. Where a base is used, the amount here is preferably up to 10 parts of the base per 100 parts of lignocellulose. In connection with the metal oxide or oxides, the amount is preferably up to 5 parts per 100 parts of lignocellulose, while in the case of sulfur the amount is preferably up to 15 parts per 100 parts of lignocellulose.

Where the reactant is steam, this steam is preferably supplied to the autoclave or other confined reactor at a temperature of 300–550° F. and the reaction is permitted to proceed for from 4–60 minutes. In general, the longer periods of time are used with the lower temperatures while shorter periods are required with higher temperatures.

The steam may be saturated or superheated and may be at a pressure of between 200–1,000 pounds per square inch gauge. In the preferred process, the temperature of the steam is between 425–500° F. and the steam is superheated.

Where sulfur is the reactant in conjunction with the steam, the sulfur is preferably finely divided to a particle size that is preferably no more than 100 mesh on a standard screen. An especially preferred range of particle size is between 200–300 mesh. The reaction time and the reaction temperature are about the same as that given above in connection with steam alone as the reactant.

Where the reactant is a mixture of sulfur and ammonium hydroxide, the sulfur is preferably present in an amount as given above. The ammonium hydroxide is preferably present as a 26° Be' solution in water containing from 27–30% ammonia, but anhydrous ammonia in the gas phase could be introduced into the autoclave. The ammonium hydroxide is preferably used in an amount between 2.5–10.% by weight of the ligno-cellulose. The reaction temperature and times are preferably substantially the same as those given above in connection with steam.

Where the reactant is a mixture of sulfur and lime, the sulfur is preferably used in about the same amount as given above, the lime is preferably in an amount between 2.5–10.0% by weight of the lignocellulose. The reaction temperatures and times are substantially the same as those given above in connection with steam.

The products of the reactions of this invention may be finished shaped materials, moldable compositions that may be used to make molded products either by injection method or by batch molding or extrudable compositions. The injection method may be used as the material will flow when heated. Where the product is molded after the reaction, this product is preferably removed from the reaction vessel and then ground to a fine powder that is preferably not over 50 mesh in size. The finely divided moldable material is heated to a temperature just sufficient to cause the material to flow and fill the mold under the pressure used. This temperature is kept sufficiently low, however, that losses are minor and breakdown due to decomposition is kept to a minimum. The preferred temperature is between 250–400° F.; however, with special plasticizers the material can be molded at room temperature.

The molding pressures may be any pressure sufficient to cause the material to fill completely the mold and will vary depending upon the shape of the mold, the nature of the moldable material and other factors. In the preferred process to produce high density materials this pressure is between 100–10,000 pounds per square inch. The molding time is only sufficient to cause the moldable material to fill the mold and set, and again will vary depending upon the type of mold being used, the temperature, the nature of the moldable material and similar factors. In general, the molding time will vary between 0.2–15 minutes.

Where the reactants are gaseous such as the mixture of formaldehyde and sulfur dioxide, they may easily be introduced into the reacting vessel under superatmospheric pressure. If desired, of course, the formaldehyde may be mixed in with the lignocellulose as a liquid and the sulfur dioxide introduced as a gas under pressure. In the other alternative, sulfur is mixed in the lignocellulose in about the same amounts as set out above, formaldehyde is added to the mixture and the atmosphere of sulfur dioxide is introduced into the reacting vessel under pressure.

In the latter described methods, steam may or may not be supplied to the reaction vessel depending upon the result desired. If steam is used, it is preferably supplied at 100–1,000 pounds per square inch pressure and at a temperature of 400–550° F. In the event that a sealed press is used, the normal moisture content of the wood as well as the reaction by-products may be used to build up to a predetermined pressure which can be maintained constant by venting the excess vapors produced. This pressure is preferably between 100–600 pounds per square inch. Such a procedure eliminates the blow-ups encountered in treating wood in an ordinary hot press at high temperatures, as well as drastically reducing press time, and polymerizes a percentage of the gaseous and low molecular weight by-products to resinous-like materials which function as binders for lignocellulose particles. If desired, a two step process may be used in which the first step includes the pressure treatment and the second step includes venting the vapors to atmospheric pressure followed by a 2–10 minute heat treatment period before removing the material from the press or the autoclave.

It was also found that when the reaction temperature is increased, the reaction time was considerably decreased. Thus, where ground lignocellulose was used with steam at 300 pounds per square inch and about 425–450° F. temperature as a reactant the reaction time was found to be 20 minutes at this 300 pounds per square inch pressure. When the pressure was increased to 400 pounds per square inch, the reaction time was only about 7 minutes. Where the steam pressure was increased to 500 pounds per square inch, the reaction time was reduced to between 4–5 minutes. These steam pressures were all gauge pressures.

The reaction temperatures and times are controlled as desired to produce flow or moldability in the autoclave product and strength and stability in the final product. Thus, where the product is to be used as a molding material, it was discovered that under the above conditions with plain lignocellulose a reaction time of less than 20 minutes resulted in poor flow. But at this same steam pressure and using the same lignocellulose a reaction time of over 30 minutes produced a high quality moldable product. Apparently steam breaks down the lignocellulose so that the lignin acts as a binder while some of the hydrolyzed products of the reaction operate as plasticizers. In the high pressure confined atmosphere method of this invention, these reaction products are primarily retained. In the prior processes where a hydrolyzing reaction was carried out either in the atmosphere or in a slurry, many of the by-products either passed off as gases or were dissolved and removed in the liquid. Thus, by avoiding excess water the process of this invention results in the saving of substantial portions of the hemi-celluloses and makes them available for use as plasticizers. However, if the reaction is carried on too long a time at too high a temperature, the hemi-celluloses and other hydrolyzed products of the reaction tend to polymerize so that the final product exhibits lack of flow and is difficult to mold. The nature of these polymerizates is not completely understood.

Acetylene produces a moldable and extrudable composition that has an extremely high strength. The acetylene can be used with the lignocellulose and Vinsol only or can be used in combination with the above-mentioned reactants including sulfur, aniline, zinc oxide, and the like. Thus, a composition made up of 100 parts of finely divided wood, 15 parts of Vinsol, 12 parts of sulfur, 5 parts of aniline, 2 parts of zinc oxide, and 5 parts of calcium carbide was autoclaved for 25 minutes in the presence of steam and at a pressure of 300 pounds per square inch gauge and an autoclave temperature of 425° F. The resulting product was found to have a modulus of rupture of 9074 pounds per square inch.

The acetylene can be introduced into the autoclave either in the gaseous state under pressure or as set out in the preceding example by incorporating finely divided calcium carbide in the mixture. When this carbide is subjected to moisture in the mixture such as steam, acetylene is produced and enters into the reaction. The calcium hydroxide residue operates to neutralize any acidic by-products resulting from the lignocellulose reaction.

When calcium carbide is used as a source of acetylene, it is preferred that not more than 20 parts of the calcium carbide be used per 100 parts of lignocellulose. When acetylene gas is used, either introduced into the autoclave in the gaseous phase under pressure or in solution form in a solvent such as acetone, the preferred amount of acetylene is not more than about 50 parts of the acetylene per 100 parts of the lignocellulose.

Having described my invention as related to the embodiment set out herein, it is my intention that the invention be not limited by any of the details of description unless otherwise specified, but rather be construed broadly within its spirit and scope as set out in the accompanying claims.

I claim:

1. The method of making a moldable composition comprising reacting a mixture consisting essentially of comminuted lignocellulose and a finely divided solvent extracted solid pine wood resin substantially free of wood rosin by heating the mixture in the presence of steam while confining the mixture under superatmospheric pressure.

2. The method of making a moldable composition comprising reacting an essentially dry mixture consisting essentially of comminuted lignocellulose, a finely divided solvent extracted solid pine wood resin substantially free of wood rosin, and sulfur, in the presence of steam, while confining the mixture under superatmospheric pressure.

3. The method of claim 2 wherein said sulfur is present in an amount up to about 20% by weight.

4. The method of claim 2 wherein said sulfur is present in an amount up to about 20% by weight and steam at a temperature of about 300–550° F.

5. The method of making a moldable composition comprising reacting a mixture consisting essentially of comminuted lignocellulose, a finely divided solvent extracted solid pine wood resin substantially free of wood rosin, and a nitrogen containing base having a reactive hydrogen atom while confining the mixture under superatmospheric pressure.

6. The method of claim 5 wherein said base is aniline.

7. The method of making a moldable composition comprising reacting a mixture consisting essentially of comminuted lignocellulose, a finely divided solvent extracted solid pine wood resin substantially free of wood rosin, a nitrogen containing base having a reactive hydrogen atom, and a member of the class consisting of zinc oxide, titanium oxide, and manganese oxide while confining the mixture under superatmospheric pressure.

8. The method of making a moldable composition comprising reacting an essentially dry mixture consisting essentially of comminuted lignocellulose; a finely divided solvent extracted solid pine wood resin substantially free of wood rosin; sulfur; a nitrogen containing base having a reactive hydrogen atom; and a member of the class consisting of zinc oxide, titanium oxide, and manganese oxide while confining the mixture under superatmospheric pressure.

9. The method of claim 8 wherein said base is aniline.

10. The method of making a moldable composition comprising reacting a mixture consisting essentially of comminuted lignocellulose, sulfur, a finely divided solvent extracted solid pine wood resin, substantially free of wood rosin, aniline, and zinc oxide while confining the mixture under superatmospheric pressure.

11. A product prepared essentially by the method of claim 1.

12. A product prepared essentially by the method of claim 2.

13. A product prepared essentially by the method of claim 5.

14. A product prepared essentially by the method of claim 7.

15. A product prepared essentially by the method of claim 8.

16. The method of claim 2 wherein sulfur dioxide is present in said mixture.

17. The method of claim 2 wherein formaldehyde is present in said mixture.

18. The method of claim 8 wherein sulfur dioxide is present in said mixture.

19. The method of claim 8 wherein formaldehyde is present in said mixture.

References Cited in the file of this patent

UNITED STATES PATENTS

| | | |
|---|---|---|
| 2,156,160 | Olson et al. | Apr. 25, 1939 |
| 2,486,601 | Irwin | Nov. 1, 1949 |
| 2,685,529 | Lighthall et al. | Aug. 3, 1954 |
| 2,706,160 | Glab | Apr. 12, 1955 |
| 2,708,637 | Glab | May 17, 1955 |